United States Patent
Dearman

(10) Patent No.: US 9,936,329 B2
(45) Date of Patent: Apr. 3, 2018

(54) METHODS, APPARATUSES, AND COMPUTER PROGRAM PRODUCTS FOR OPERATIONAL ROUTING BETWEEN PROXIMATE DEVICES

(75) Inventor: David A. Dearman, San Bruno, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/416,727

(22) Filed: Mar. 9, 2012

(65) Prior Publication Data
US 2013/0237147 A1    Sep. 12, 2013

(51) Int. Cl.
| H04B 5/00 | (2006.01) |
| H04W 4/00 | (2018.01) |
| H04W 4/20 | (2018.01) |
| G06F 9/50 | (2006.01) |
| H04W 4/02 | (2018.01) |

(52) U.S. Cl.
CPC ............ *H04W 4/00* (2013.01); *G06F 9/5044* (2013.01); *G06F 9/5055* (2013.01); *H04W 4/206* (2013.01); *G06F 2209/502* (2013.01); *G06F 2209/509* (2013.01); *H04W 4/008* (2013.01); *H04W 4/02* (2013.01); *H04W 4/023* (2013.01)

(58) Field of Classification Search
CPC ..... H04W 4/008; H04W 4/002; H04W 4/023; H04W 4/206; G06F 2209/502
USPC ........................................ 455/41.1; 705/26.1
See application file for complete search history.

(56) References Cited

U.S. PATENT DOCUMENTS

| 7,466,977 B2 | 12/2008 | Levien et al. |
| 7,536,182 B2 | 5/2009 | Zhang |
| 8,494,439 B2 * | 7/2013 | Faenger .................. 455/3.06 |
| 2007/0245173 A1 | 10/2007 | Elliott et al. |
| 2008/0085682 A1 * | 4/2008 | Rao .................. H04M 1/7253 455/74 |
| 2008/0318592 A1 | 12/2008 | Mandalia |
| 2009/0037614 A1 | 2/2009 | Saripalli |

(Continued)

FOREIGN PATENT DOCUMENTS

| CN | 102238280 A | 11/2011 |
| CN | 102364957 A | 2/2012 |

(Continued)

OTHER PUBLICATIONS

Office Action for Taiwanese Patent Application No. 102108251 dated Nov. 25, 2016, 6 pages.
Office Action and Search Report for Chinese Patent Application No. 201380023715.2 dated May 12, 2017, with English translation, 14 pages.

(Continued)

*Primary Examiner* — Raj Chakraborty
(74) *Attorney, Agent, or Firm* — Alston & Bird LLP

(57) ABSTRACT

Methods, apparatuses, and computer program products are herein provided for operational routing between proximate devices. A method may include receiving an indication that a second device is proximate a first device. The method may further include receiving an indication of at least one functional capability of the second device. The method may further include causing, by a processor, transfer of an operation from the first device to the second device based on at least one functional capability of the first device and the at least one functional capability of the second device and further based on the operation. Corresponding apparatuses and computer program products are also provided.

23 Claims, 15 Drawing Sheets

(56) References Cited

U.S. PATENT DOCUMENTS

| | | | | |
|---|---|---|---|---|
| 2010/0017812 A1* | 1/2010 | Nigam | ................ | G06F 8/20 |
| | | | | 719/328 |
| 2011/0145859 A1 | 6/2011 | Novack et al. | | |
| 2011/0268218 A1 | 11/2011 | Kang et al. | | |
| 2011/0275358 A1 | 11/2011 | Faenger | | |
| 2012/0032783 A1* | 2/2012 | Ahn | ................ | G06F 3/1423 |
| | | | | 340/6.1 |
| 2012/0066722 A1* | 3/2012 | Cheung et al. | ............. | 725/62 |
| 2012/0278192 A1* | 11/2012 | Shirron | ............ | G06Q 20/123 |
| | | | | 705/26.1 |
| 2012/0296964 A1* | 11/2012 | Chaturvedi | ......... | H04M 3/562 |
| | | | | 709/204 |
| 2013/0147686 A1* | 6/2013 | Clavin | ................ | G06F 3/013 |
| | | | | 345/8 |

FOREIGN PATENT DOCUMENTS

| | | |
|---|---|---|
| TW | 1243313 | 11/2005 |
| TW | 200928774 | 7/2009 |
| WO | WO 02/086714 A2 | 10/2002 |

OTHER PUBLICATIONS

Office Action for European Patent Application No. 13710444.4 dated May 30, 2017, 7 pages.

International Search Report and Written Opinion for Application No. PCT/FI2013/050205 dated Jul. 6, 2013.

Kafaie, S. et al., *Augmented Mobile Devices through Cyber Foraging*, Parallel and Distributed Computing (ISPDC), 2011 10$^{th}$ International Symposium On, IEEE (Jul. 6, 2011) 145-152 XP032079098.

Kristensen, M. D. et al.., *Improving pervasive positioning through three-tier cyber foraging*, Pervasive Computing and Communications Workshop (PERCOM Workshops), 2011 IEEE International Conference On, IEEE, (Mar. 21, 2011) 135-140 XP031864638.

Frank Siegemund and Tobias Krauer; "Integrating Handhelds Into Environments of Cooperating Smart Everyday Objects"; 2004; Proceedings of the 2$^{nd}$ European Symposium on Ambient Intelligence.

Office Action for Chinese Patent Application No. 2013800237152 dated Nov. 16, 2017, with English summary, 9 pages.

\* cited by examiner

METHODS, APPARATUSES, AND COMPUTER PROGRAM PRODUCTS FOR OPERATIONAL ROUTING BETWEEN PROXIMATE DEVICES

TECHNOLOGICAL FIELD

An example embodiment of the present invention relates generally to user interface technology and, more particularly, relates to methods, apparatuses, and computer program products for operational routing between proximate devices.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Increased functionality in mobile computing devices has led to increasing use and, therefore, an increasing number of mobile computing devices worldwide. Each mobile computing device, however, may contain different functional capabilities, some being better suited to perform certain operations than others.

BRIEF SUMMARY

With so many different types of devices available for users today, a user may wish to utilize the specific functional capabilities of another device to perform a certain operation. In particular, while an operation may be initiated on a first device, another nearby device may be utilized for performance of that operation. In such a circumstance, it may be beneficial for the first device to recognize the nearby device, recognize that the nearby device has the functional capability to perform the operation, and then transfer the operation to the nearby device. Indeed, such intelligent operational routing between devices may provide for a better user experience.

As such, embodiments of the present invention provide for operational routing between proximate devices. In one example embodiment, a method includes receiving an indication that a second device is proximate a first device. The method further includes receiving an indication of at least one functional capability of the second device. The method further includes causing, by a processor, transfer of an operation from the first device to the second device based on at least one functional capability of the first device and the at least one functional capability of the second device and further based on the operation.

In some embodiments, causing transfer of the operation may comprise determining a first capability value of the first device based at least in part on at least one functional capability of the first device and the operation. Additionally, causing transfer of the operation may further comprise determining a second capability value for the second device based at least in part on the at least one functional capability of the second device and the operation. Additionally, causing transfer of the operation may further comprise causing transfer of the operation from the first device to the second device in an instance in which the second capability value exceeds the first capability value. In some embodiments, determining the second capability value of the second device may further comprise determining the second capability value based on a user defined preference and determining the first capability value of the first device may further comprise determining the first capability value based on the user defined preference. The operation may comprise, for example, one of receiving a call, initiating a call, receiving a text message, sending a text message, executing an application, or playing a video.

In some embodiments, the method may further comprise causing performance of the operation on the first device prior to receiving an indication that the second device is proximate the first device. In some embodiments, causing transfer of the operation may comprise causing transfer of the operation from the first device to the second device in an instance in which a user defined setting indicates that transfer of the operation is enabled.

In some embodiments, causing transfer of the operation may comprise automatically causing transfer of the operation from the first device to the second device based on at least one functional capability of the first device and the at least one functional capability of the second device and further based on the operation.

In other embodiments, the method may further comprise causing a user to be prompted as to whether the operation should be transferred from the first device to the second device. Additionally, causing transfer of the operation may comprise causing transfer of the operation in an instance in which the user indicates that the operation should be transferred from the first device to the second device.

In another example embodiment, an apparatus comprises at least one processor and at least one memory storing computer program code with the at least one memory and stored computer program code being configured, with the at least one processor, to cause the apparatus to receive an indication that a second device is proximate a first device. The at least one memory and stored computer program code are configured, with the at least one processor, to further cause the apparatus to receive an indication of at least one functional capability of the second device. The at least one memory and stored computer program code are configured, with the at least one processor, to further cause the apparatus to cause transfer of an operation from the first device to the second device based on at least one functional capability of the first device and the at least one functional capability of the second device and further based on the operation.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method comprising receiving an indication that a second device is proximate a first device. The method further includes receiving an indication of at least one functional capability of the second device. The method further includes causing transfer of an operation from the first device to the second device based on at least one functional capability of the first device and the at least one functional capability of the second device and further based on the operation.

In another example embodiment, an apparatus is provided. The apparatus comprises means for receiving an indication of at least one functional capability of the second device. The apparatus further comprises means for receiving an indication of at least one functional capability of the second device. The apparatus further comprises means for causing transfer of an operation from the first device to the second device based on at least one functional capability of the first device and the at least one functional capability of the second device and further based on the operation.

BRIEF DESCRIPTION OF THE DRAWINGS

Figure 1:
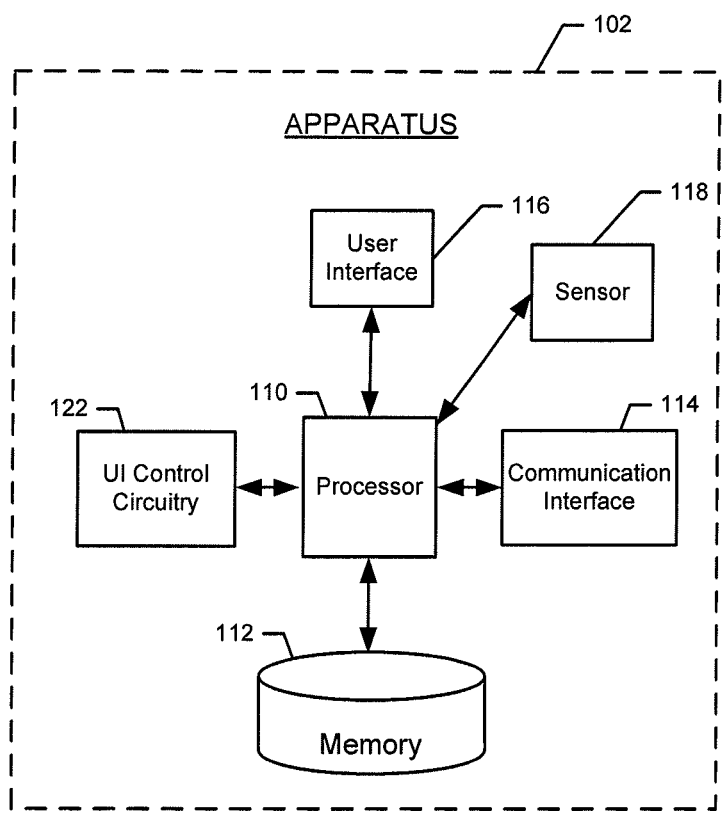
Figure 2:
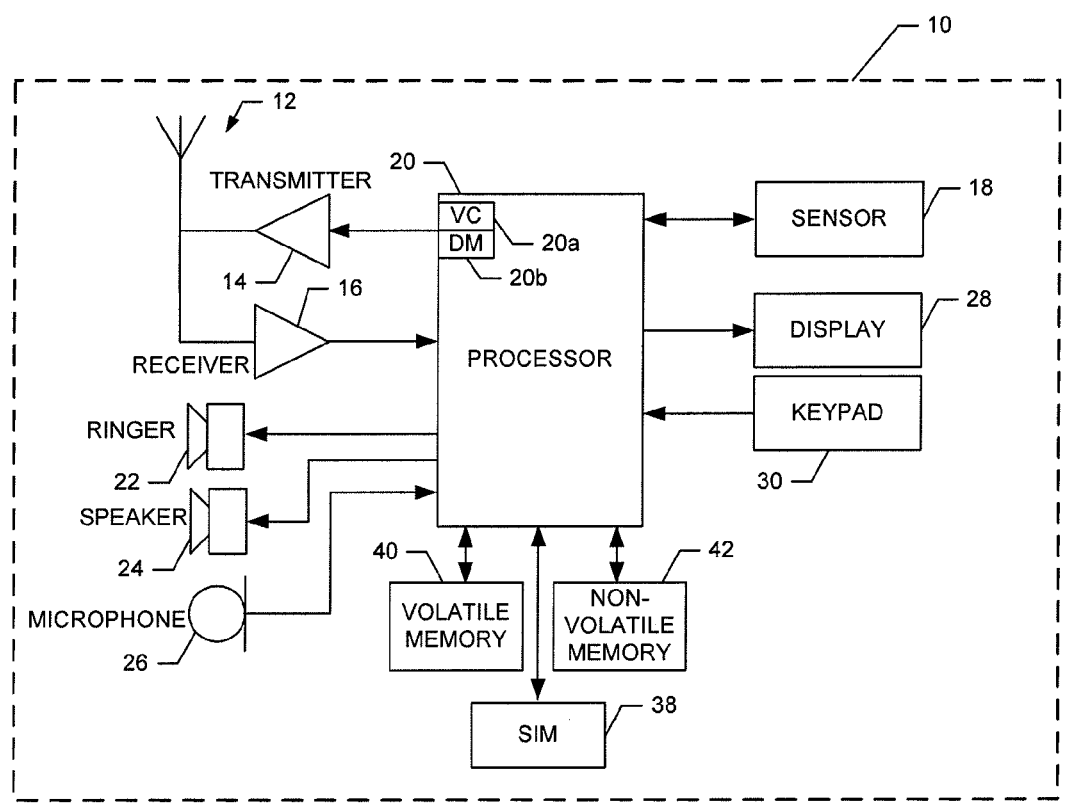
Figure 3:
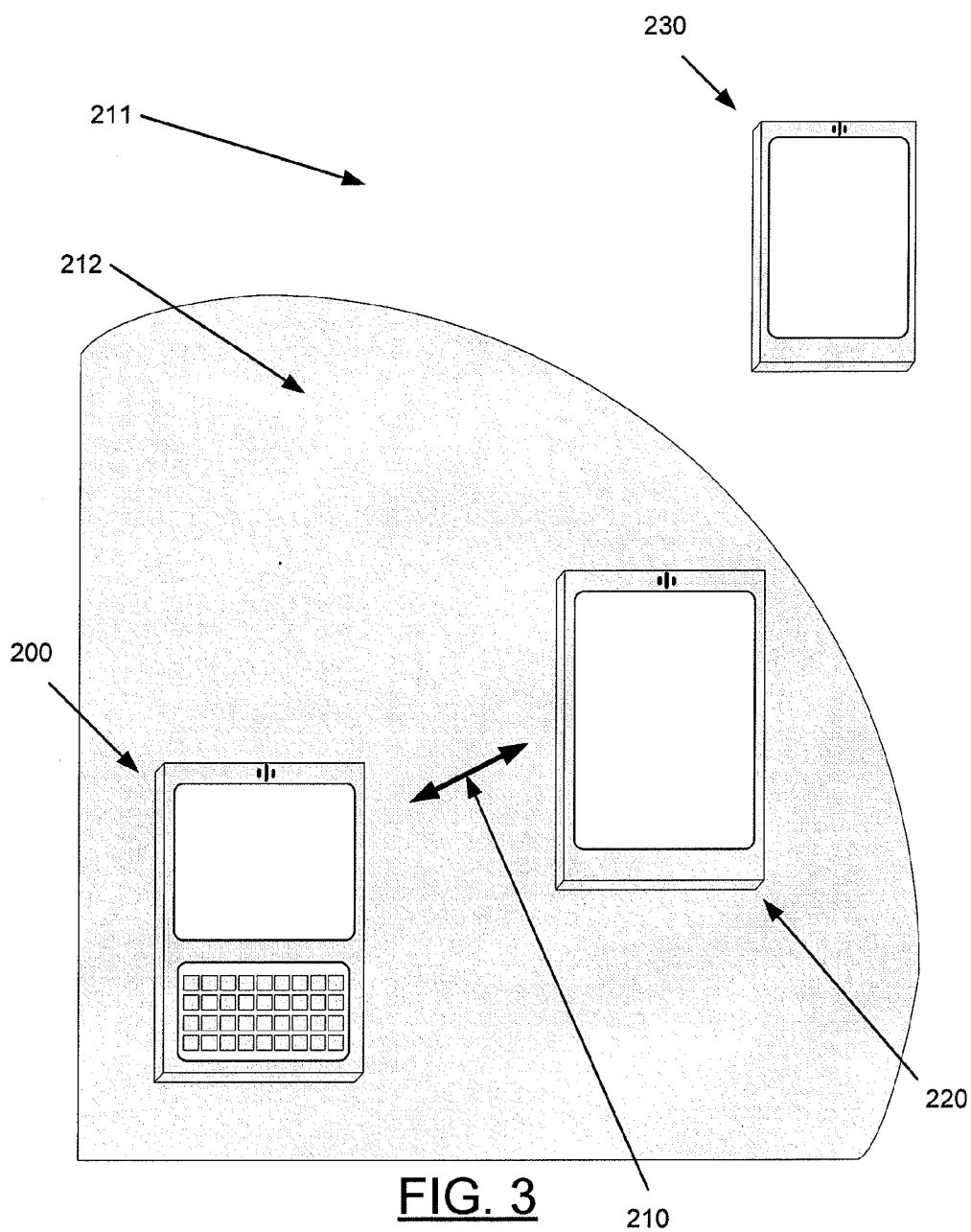
Figure 4:
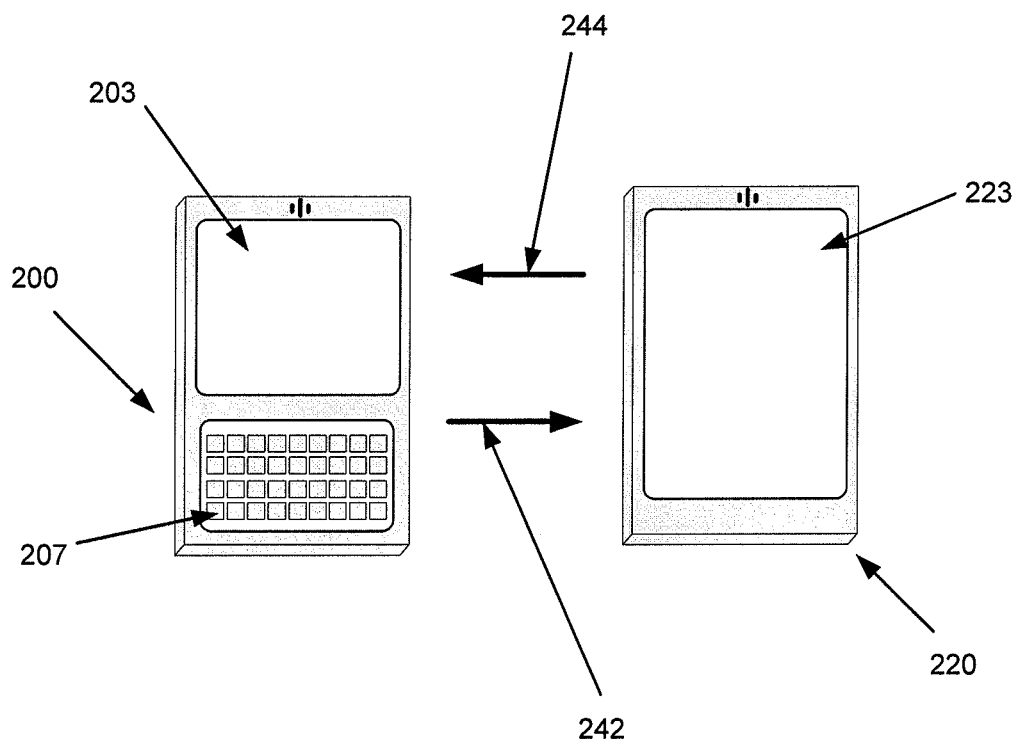
Figure 5A:
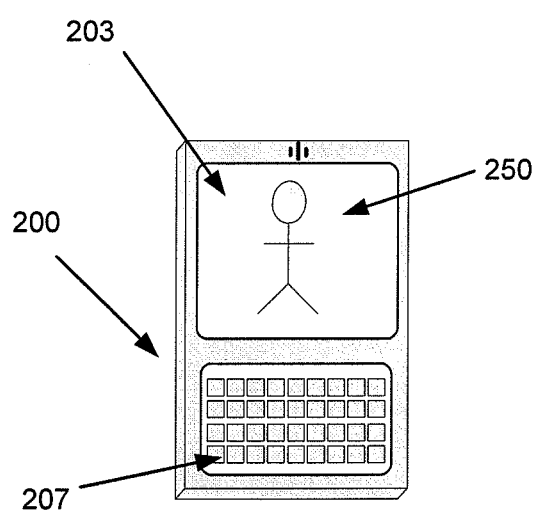
Figure 5B:
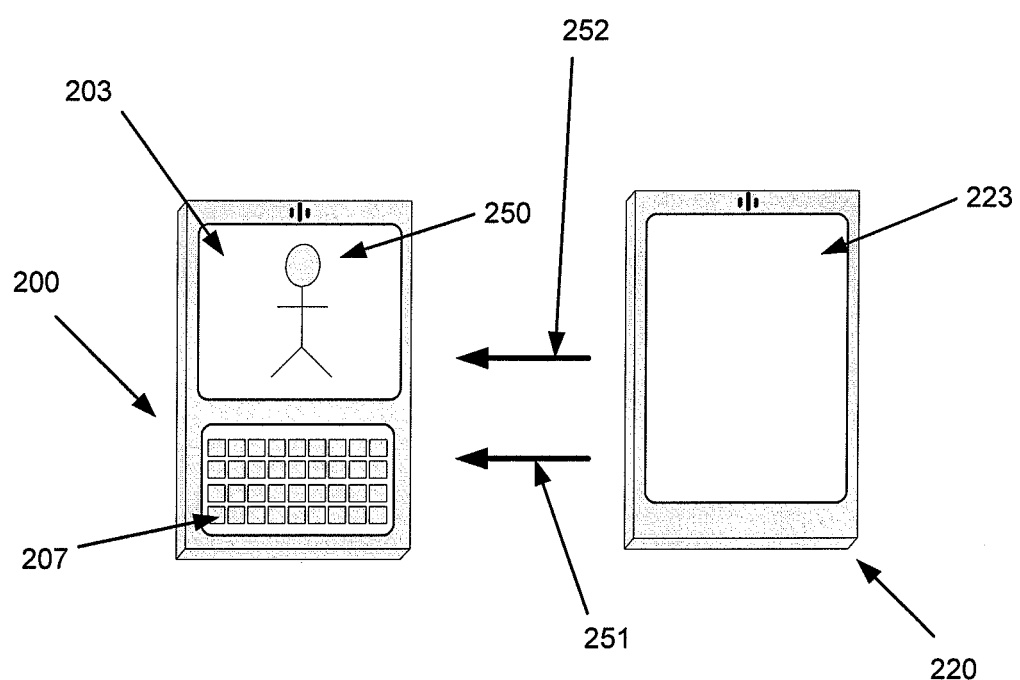
Figure 5C:
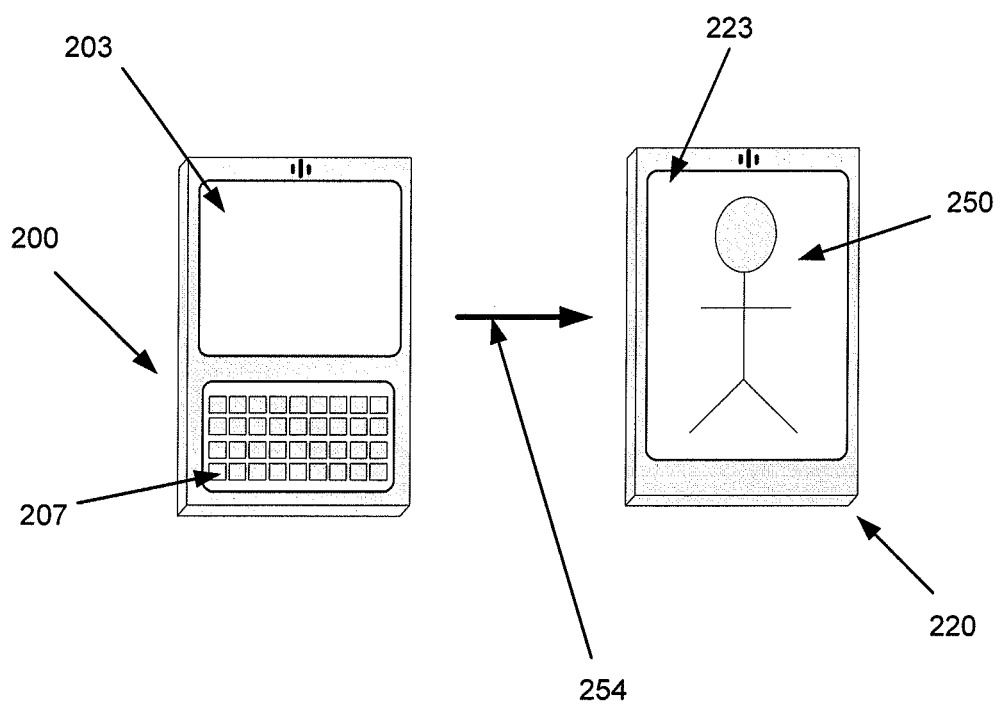
Figure 6A:
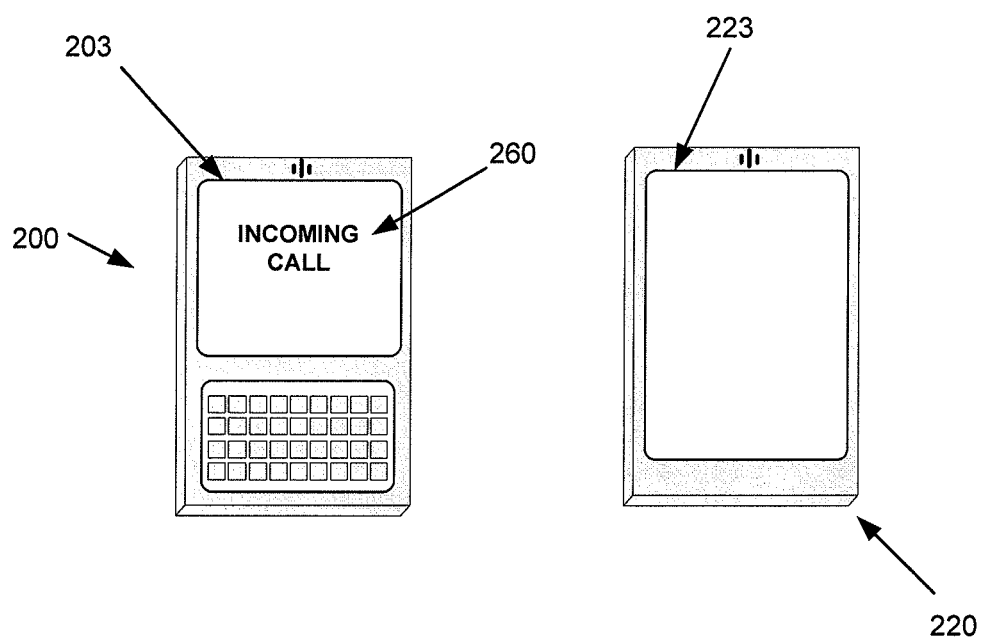
Figure 6B:
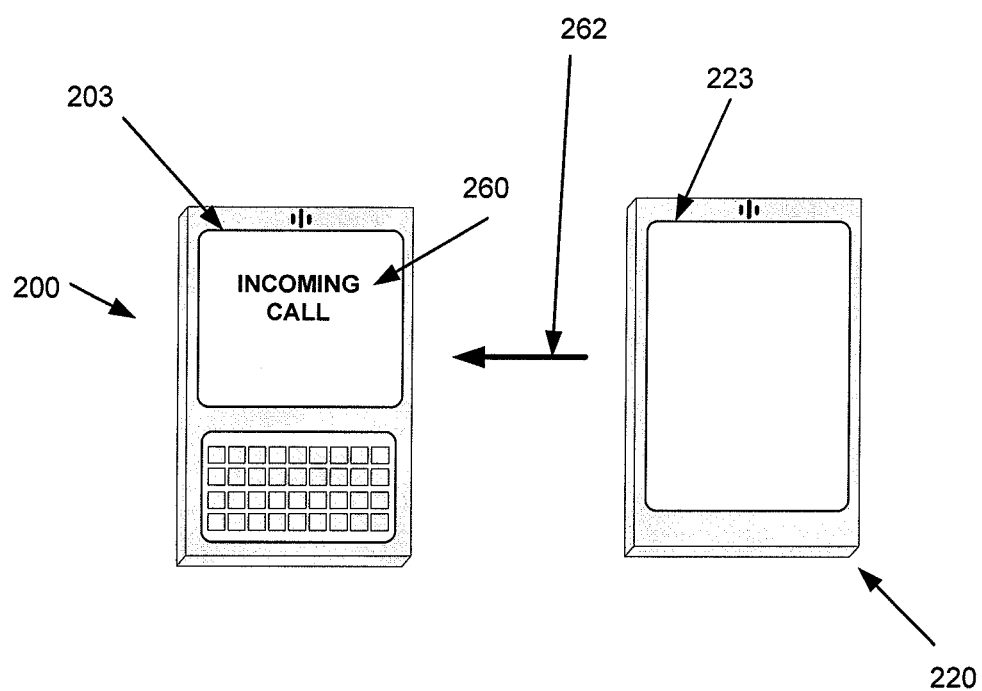
Figure 6C:
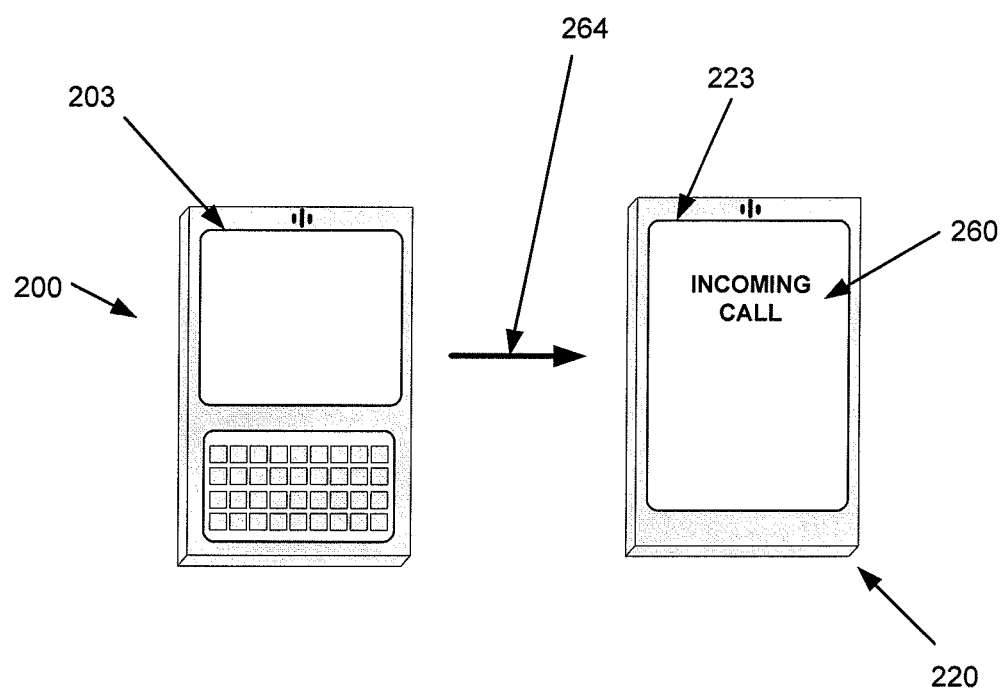
Figure 6D:
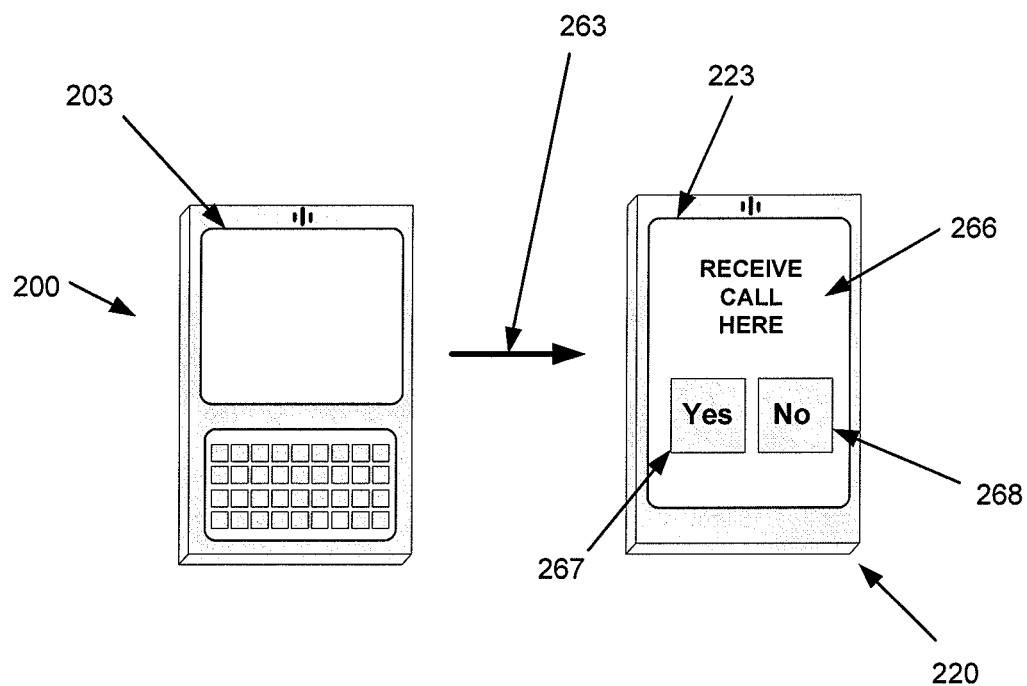
Figure 6E:
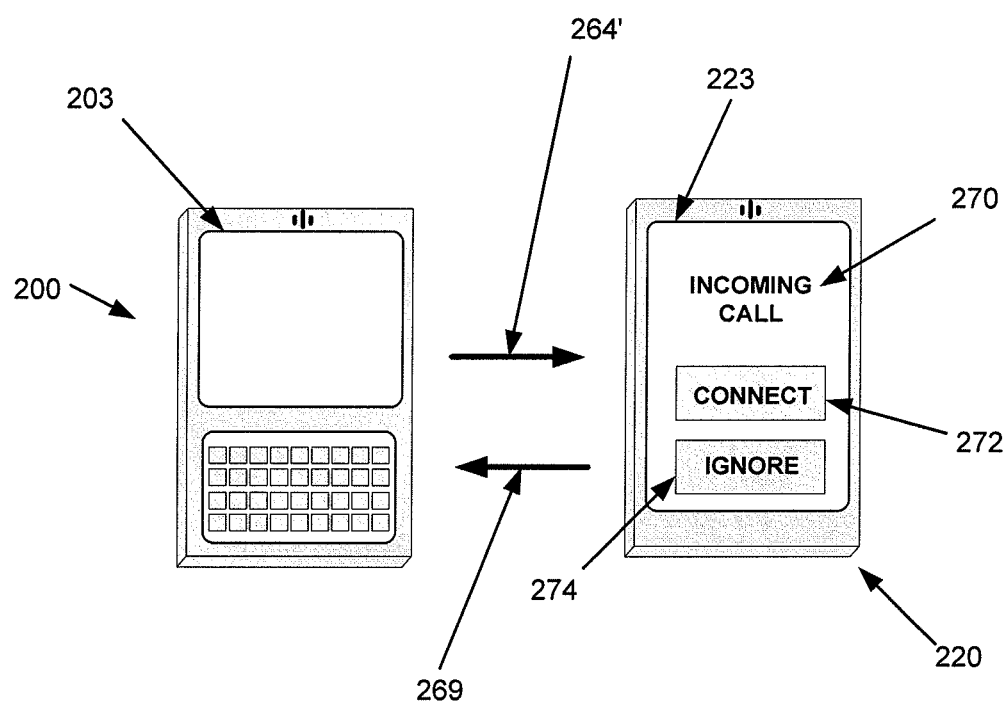
Figure 6F:
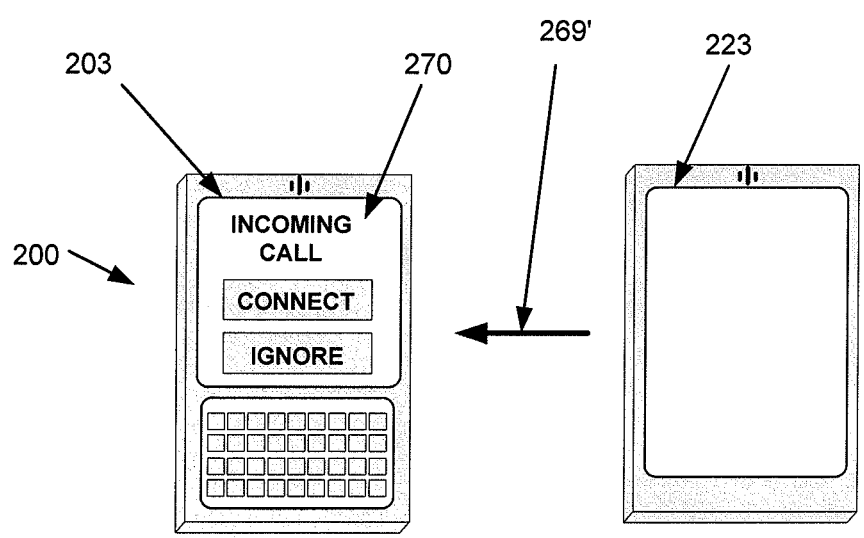
Figure 7:
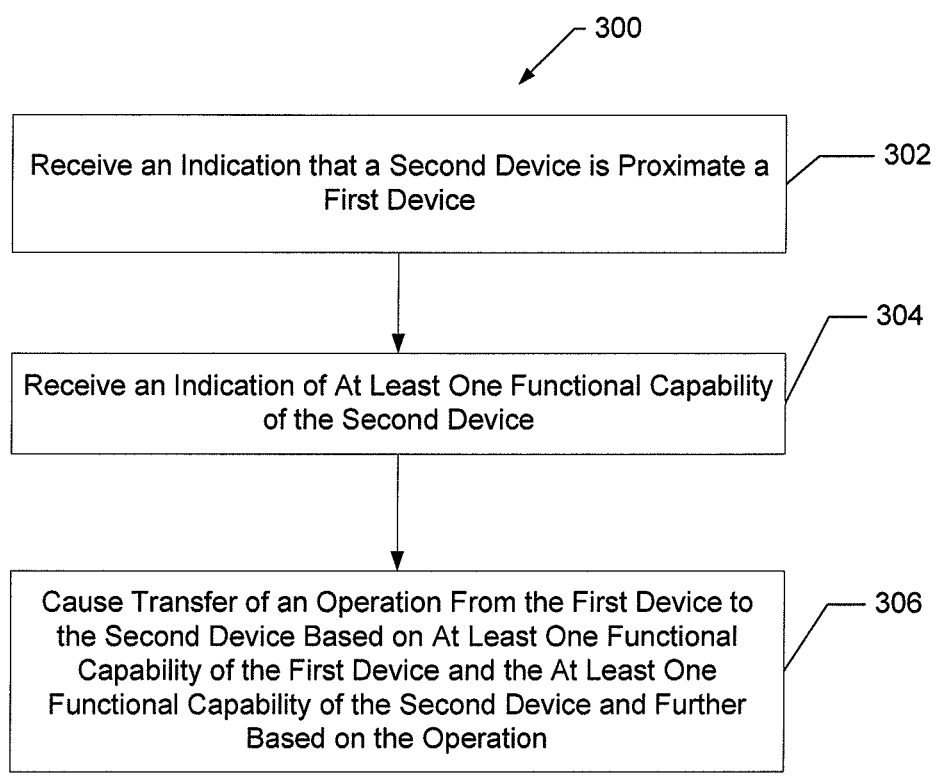
Figure 8:
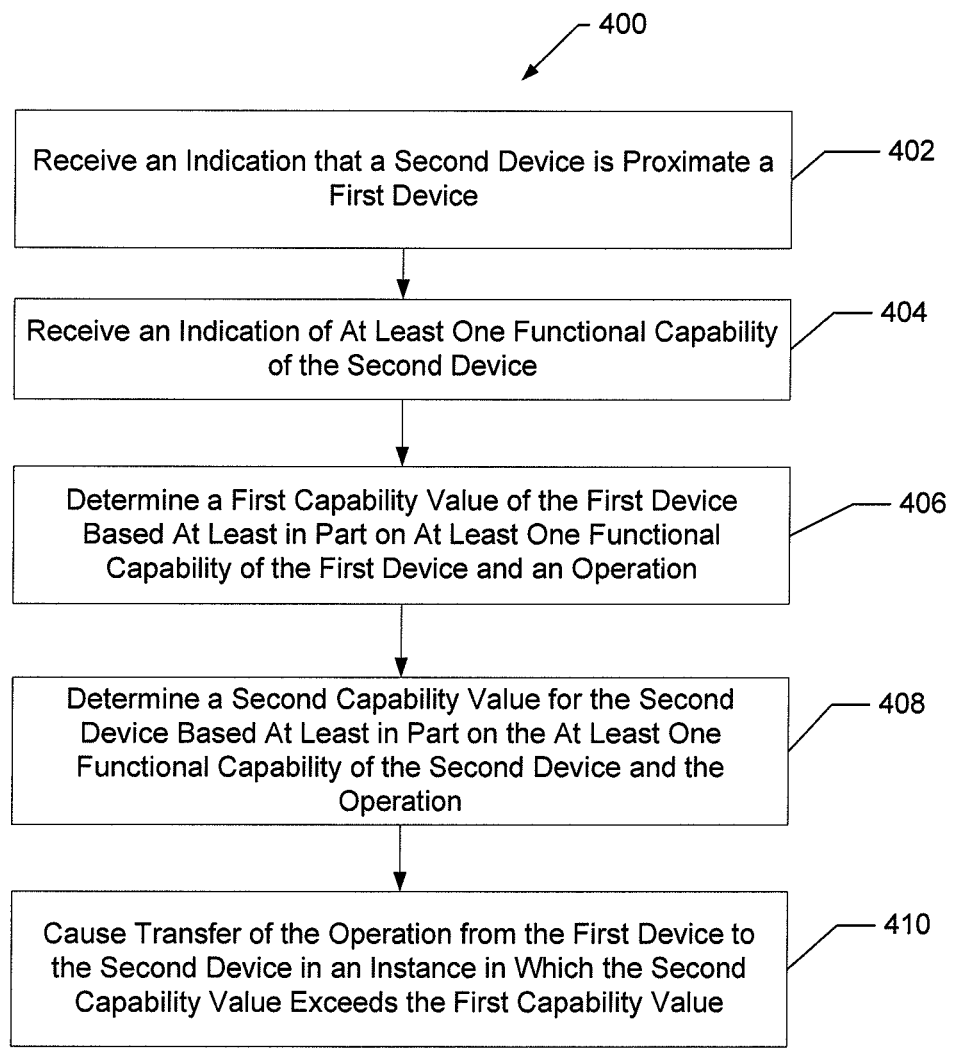

Having thus described some embodiments of the invention in general terms, reference will now be made to the accompanying drawings, which are not necessarily drawn to scale, and wherein:

FIG. 1 illustrates a block diagram of an apparatus with function capabilities for performing operations according to an example embodiment of the present invention;

FIG. 2 is a schematic block diagram of a mobile terminal according to an example embodiment of the present invention;

FIG. 3 illustrates an example environment of a first device that may embody, for example, the apparatus shown in FIG. 1, wherein a second device and a third device are positioned relative to the first device, in accordance with an example embodiment of the present invention described herein;

FIG. 4 illustrates interaction between the first device and second device shown in FIG. 3, in accordance with an example embodiment of the present invention described herein;

FIG. 5A illustrates a first device performing an operation, in accordance with an example embodiment of the present invention described herein;

FIG. 5B illustrates a second device proximate to the first device shown in FIG. 5A, in accordance with an example embodiment of the present invention described herein;

FIG. 5C illustrates transfer of the operation being performed on the first device to the second device, in accordance with an example embodiment of the present invention described herein;

FIG. 6A illustrates an incoming call to a first device, wherein a second device is proximate the first device, in accordance with example embodiments of the present invention described herein;

FIG. 6B illustrates transfer of a signal from the second device to the first device, in accordance with an example embodiment of the present invention described herein;

FIG. 6C illustrates transfer of the incoming call from the first device to the second device, in accordance with an example embodiment of the present invention described herein;

FIG. 6D illustrates a user being prompted as to whether the incoming call should be transferred from the first device to the second device, in accordance with an example embodiment of the present invention described herein;

FIG. 6E illustrates transfer of the incoming call from the first device to the second device in response to the user selecting to transfer the call in FIG. 6D, in accordance with an example embodiment of the present invention described herein;

FIG. 6F illustrates the incoming call being received on the first device in response to the user selecting not to transfer the call in FIG. 6D, in accordance with an example embodiment of the present invention described herein;

FIG. 7 illustrates a flowchart according to an example method for operational routing between proximate devices, in accordance with an example embodiment of the present invention described herein; and FIG. 8 illustrates a flowchart according to another example method for operational routing between proximate devices, in accordance with an example embodiment of the present invention described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 configured for performing operations and operational routing according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing operations and operational routing, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a user interface (e.g., a touch display capable of displaying a graphical user interface). In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of communicating according to Wi-Fi, Near Field Communications (NFC), BlueTooth, Worldwide Interoperability for Microwave Access (WiMAX) or other proximity-based communications protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, sensor 18, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, sensor 18, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), sensor 18, and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, sensor 118, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein.

As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. Additionally or alternatively, the communication interface 114 may be configured to support communications in accordance with any proximity-based protocol including, for example, Wi-Fi, NFC, BlueTooth, WiMAX or the like. The communication interface 114 may additionally be in communication with the memory 112, user interface 116, and/or UI control circuitry 122, such as via a bus.

The sensor 118 may be in communication with the processor 110 and/or UI control circuitry 122. The sensor 118 may be configured to sense and/or detect input. In embodiments wherein the apparatus 102 is embodied as a mobile terminal 10, the sensor 118 may be embodied as or comprise the sensor 18 (shown in FIG. 2). In some embodiments, the processor 110 and/or UI control circuitry 122 may be configured to receive input from the sensor 118 and determine that at least one other apparatus (e.g., a second device) is proximate the apparatus 102. In some embodiments, the sensor 118 may comprise a proximity sensor and/or light sensor.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touchscreen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display (e.g., touchscreen). The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The apparatus 102 may be configured to determine the relative position of other devices. In some embodiments, the apparatus 102 may be configured to determine an instance in which at least one other device is positioned proximate to the apparatus 102. For example, in some embodiments, the apparatus 102 may be configured to receive an indication that at least one other device is proximate the apparatus 102. In this regard, the apparatus 102 may be configured to transmit signals to and/or receive signals from other devices, such as through a proximity-based communications, e.g., Wi-Fi, NFC, BlueTooth, Wi-MAX, etc. In such a manner, the apparatus 102 may be configured to recognize the proximate nature of other devices based on the ability to transmit signals to and/or receive signals from the other devices, such as by recognizing signals having a strength and/or a quality that satisfy respective thresholds as being proximate the apparatus.

In some embodiments, the apparatus 102 may be configured to determine relative distance of the other devices. For example, the apparatus 102 may be configured to determine the distance between the first device embodying the apparatus 102 and the other devices based on characteristics of the signal (e.g., time traveled, signal strength, signal quality, etc.) with distances less than a predefined threshold being considered proximate one another. In some embodiments, each other device may transmit a signal to the apparatus 102. The signal may provide the specific position of the other device such that the apparatus 102 may determine the relative position of the other device with the other device being considered proximate in instances in which the relative position satisfies a predefined positional relationship. Additionally or alternatively, the apparatus 102 may be configured to sense the presence of another device, such as through a sensor (e.g., sensor 118), with another device being considered proximate if the presence of the other device is sensed. While certain embodiments of techniques for determining the proximity of devices are described, other techniques may be employed by other embodiments of the present invention.

Though some example embodiments used herein may describe the apparatus 102 being configured as the first device, in other embodiments, the apparatus 102 may not be the first device. In such embodiments, the apparatus 102 may be embodied by a third device (e.g., a server or other network entity) that determines the proximate nature of a separate first device with respect to a separate second device. For example, the first device and second device may each determine contextual information, such as any type of sensed features (e.g., position, location, etc.). Then each of the first device and second device may transmit the contextual information to a third device (e.g., server). In some embodiments, the first device may transmit the contextual information to the second device. Additionally or alternatively, the second device may transmit the contextual information to the first device. The device that receives the contextual information (e.g., the first, second, and/or third device) may then determine the proximity of the first device to the second device. Then, in some embodiments, that device (e.g., the device that determined the position and/or orientation) may provide an indication of the proximity of the first device to the second device to another device, such as the first device, the second device, the third device, etc.

In some embodiments, the apparatus 102 may be configured to receive an indication that a second device is proximate. For example, with reference to FIG. 3, the first device 200 may embody the apparatus 102 and may receive an indication that the second device 220 is proximate. As noted above, in some embodiments, the indication may come from a signal (e.g., signal 210) transmitted and received between the first device 200 and the second device 220. In some embodiments, the determination as to whether a device is proximate may be based on the ability of the first device 200 to receive the signal 210 from the second device 220. In such a manner, a third device 230 may be positioned too far away for a similar signal to be transmitted and received between the first device 200 and the third device 230. Thus, an area 212 (e.g., a relative radius extending from the first device 200) may be defined such that a device (e.g., the second device 220) within the area 212 may be considered proximate and a device (e.g., the third device 230) outside the area 212 (e.g., in area 211) may not be considered proximate. Additionally or alternatively, as noted above, in some embodiments, the determination as to whether a device is proximate to the apparatus 102 may be based on a predefined distance (e.g., 5 ft., 6 in., etc.) and/or signal strength, signal quality, etc.

In some embodiments, each of the devices may be configured to include an embodiment. However, though each device may encompass embodiments of apparatus 102, each device may be configured differently such that each device may have different functional capabilities. Nonetheless, in some embodiments, each or a least a plurality of devices may be configured to determine the proximity of the other device(s).

Each device may comprise at least one functional capability. The functional capabilities of a device may define which operations the device has the ability to perform. For example, a device may include components (e.g., processor 110, memory 112, communication interface 114, user interface 116, sensor 118, UI control circuitry 122, etc.) that enable certain functionality (e.g., wireless access to the internet, cellular connection, application execution, etc.). The components and functionality make up the functional capabilities of the device and define whether a device may perform a certain operation (e.g., receive a call, initiate a call, receive a text message, send a text message, execute a certain application, play a video, etc.). For example, a first device may have the functional capability to connect to a cellular network to conduct a telephone call, whereas a second device may not have the functional capability to connect to a cellular network (whether at all or just at the moment). In such a circumstance, the first device has the functional capability of cellular communication and the second device does not.

In some embodiments, the functional capabilities of each device may help define how the device may perform an operation. For example, with reference to FIG. 4, a first device 200 may comprise a display 203 and a dedicated keyboard 207 (e.g., as opposed to a virtual keyboard). Thus, the first device 200 may have the functional capability of the dedicated keyboard 207 to enable a user to type a text or email. This may be opposed to a second device 220 that comprises a display 223 without a dedicated keyboard. Here, the second device 220 may have the functional capability to display a virtual keyboard (not shown) to enable a user to type a text or email. In such a regard, the functional capabilities of the first device 200 includes use of a dedicated keyboard 207, whereas the functional capabilities of the second device 220 includes display of a virtual keyboard.

Indeed, different devices often have different functional capabilities. Moreover, devices with many different types of functional capabilities are increasing in everyday life. In fact, many people own multiple devices with functional capabilities, whether mobile or fixed. As such, considering that one device may be better (or at least differently) suited for performing a certain operation than another device, embodiments of the present invention enable for transfer of an operation from one device to another proximate device.

The apparatus 102 may be configured to receive an indication of at least one functional capability of a proximate device. In such a regard, in some embodiments, the functional capabilities of a proximate device may be defined so that the apparatus 102 may determine the functional capabilities of the proximate device. For instance, in some embodiments, the indication of the at least one functional capability of the proximate device may be defined as a code (e.g., a value, a handle, an enumeration, a message, etc.). Thus, the apparatus 102 may receive the code (e.g., the indication) and based on that code, determine the at least one functional capability of the proximate device. For example, with reference to FIG. 4, the second device 220 may have the functional capability for performing cellular communication. As such, the second device 220 may transmit a signal (e.g., signal 244) to the first device 200. Within the signal 244, a code could be embedded that indicates the functional capability of cellular communication to the first device 200. For example, the code may be the letters "CC", which may stand for cellular communication. The first device 200 may receive the code "CC" and determine that the second device 220 has the functional capability of cellular communication. Though this example uses the letter "CC" for the code, other types of codes are contemplated. Indeed, in some embodiments, the code may contain a qualifying value associated with the letter code to enable the first device 200 determine how (or how effective) the functional capability of the second device is performed.

In some embodiments, the indication of the at least one functional capability may be transmitted to the apparatus 102, such as from the proximate device or another device (e.g., a server or other network entity). In particular, in some embodiments, the indication of the at least one functional capability may be transmitted to the apparatus 102 in response to a signal requesting information regarding the at least one functional capability of the proximate device. For example, with reference to FIG. 4, a first device 200 may transmit a signal 242 to a second proximate device 220 requesting at least one functional capability of the second device 220. In response, the second device 200 may transmit a second signal 244 to the first device 200 with an indication of at least one functional capability of the second device 200. Though the above example includes two signals being sent between the first device and the second device, embodiments of the present invention may be utilized with any indication of at least one functional capability of a proximate device, and are not meant to be limited to transmission and receipt of signals directly between the first and second device. For example, a single signal may be transmitted from the second device 220 that indicates the location of the second device 220 and at least one functional capability of the second device 220.

In some embodiments, the apparatus 102 is configured to determine at least one functional capability of the first device. In such an embodiment, as is consistent with the disclosure herein, the apparatus 102 may determine the available components and their capabilities. Additionally or alternatively, the apparatus 102 may be configured to receive an indication of at least one functional capability of the first device.

In some embodiments, the apparatus 102 is configured to compare the functional capabilities of the first device and second device. Then, based on at least one functional capability of the first device and the at least one functional capability of the second device, the apparatus 102 may be configured to cause transfer of an operation from the first device to the second device. The second device may then receive and begin performance of the operation.

In some embodiments, the respective functional capabilities of the first and/or second devices may be specific to a certain operation. Thus, in some embodiments, the apparatus 102 may be configured to compare the functional capabilities of the first device for a certain operation with the functional capabilities of the second device for the same operation. Then, based on at least one functional capability of the first device and the at least one functional capability of the second device and further based on the operation, the apparatus 102 may be configured to cause transfer of the operation from the first device to the second device.

As noted herein, some embodiments of the present invention seek to enable transfer of an operation from a first device to a second proximate device when the second device is better suited to perform the operation. In this regard, the second device may be considered better suited in a number of different scenarios including instances in which the second device will perform the operation more efficiently, in a more user friendly manner, more quickly, etc. As such, in some embodiments, the apparatus 102 may be configured to cause transfer of the operation in an instance in which the comparison of the respective functional capabilities of the first device and the second device and the certain operation dictate that the second device may be better suited to perform the operation.

An example of one embodiment of the present invention can be seen with reference to FIGS. 5A, 5B, and 5C. FIG. 5A shows a first device 200 that embodies apparatus 102 with a display 203 and a dedicated keyboard 207. The first device 200 is currently displaying a video of a stick-figure (e.g., performing operation 250).

FIG. 5B illustrates that a second device 220 comes proximate to the first device 200. As such, the first device 200 receives an indication that the second device 220 is proximate to the first device 200, such as through signal 251. Additionally, the first device 200 receives an indication of at least one functional capability of the second device 220. In such a case, the second device 220 transmits a signal 252 to the first device 200 that indicates that it has a display 223 capable of displaying a video (e.g., a functional capability). Even more, the signal 252 may indicate characteristics of the display 223 and/or functional capability, such as the size of the display 223 available for displaying the video. As noted above, in some embodiments, signal 251 and signal 252 may comprise one signal that indicates that a device is proximate and indicates at least one functional capability of that device.

The first device 200 may receive the indication of the functional capability of the second device 220 and compare the functional capability of the first device 200 with the functional capability of the second device 220. Additionally, as noted above, the first device 200 may take into account the certain operation to be performed (e.g., playing a video). For example, the first device 200 may compare its smaller display 203 to the larger display 223 of the second device 220. Then, with reference to FIG. 5C, the first device 200 may cause transfer of the operation 250 (e.g., playing the video) to the second device 220, such as through signal 254. Thus, the second device 220 may receive signal 254 and cause display of video on display 223 (e.g., perform operation 250). In such a manner, embodiments of the present invention enable performance of a desired operation to be optimized based on available functional capabilities of proximate devices.

The above example described with respect to FIGS. 5A, 5B, and 5C illustrates a situation in which the first device is performing the operation before the second device becomes proximate to the first device. Thus, in some embodiments, the apparatus 102 is configured to cause performance of the operation on the first device prior to receiving an indication that the second device is proximate the first device.

Embodiments of the present invention, however, are not meant to be limited to such a circumstance when the operation is already being performed. In particular, in some embodiments, the first device and second device may already be proximately positioned with respect to each other when initiation/execution of the operation is requested. For example, with reference to FIGS. 6A, 6B, and 6C, a first device 200 and a second device 220 may be proximately positioned with respect to each other. As shown in FIG. 6A, the first device 200 may receive a request for initiation of an operation 260, such as receipt of an incoming call. The notification of "INCOMING CALL" may be displayed on the display 203 accordingly.

FIG. 6B illustrates that the first device 200 may receive an indication (e.g., from signal 262 from the second device 220) that the second device 220 is proximate the first device 200 and at least one functional capability of the second device 220. Then, the first device 200 may compare the functional capabilities of the first device 200 and the second device 220 and, based on the respective functional capabilities and the operation, cause transfer of operation 260 to the second device 220 (e.g., through signal 264), as shown in FIG. 6C. As such, the notification "INCOMING CALL" may now be displayed on the display 223 of the second device 220, thereby indicating that a user may receive the incoming call on the second device 220.

As noted above, there may be any number of reasons for the first device 200 to cause transfer of the operation to the second device. For example, the second device 220 may have a stronger cellular signal strength, or perhaps a longer battery life, than the first device 200, thereby making transfer of operation 260 to the second device 220 more desirable.

In some embodiments, the apparatus 102 may be configured to automatically cause transfer of the operation from the first device to the second device based on at least one functional capability of the first device and the at least one functional capability of the second device and further based on the operation. In such a manner, the apparatus 102 may be configured to cause transfer of the operation from one device to another absent user interaction. An example of an embodiment of the present invention that utilizes automatic transfer of the operation is described above with respect to FIGS. 6A-6C.

In some embodiments, the apparatus 102 may be configured to prompt a user to determine whether to the operation should be transferred from the first device to another device. In such embodiments, the apparatus 102 may be configured to cause transfer of the operation from the first device to the second device in an instance in which the user indicates that the operation should be transferred (e.g., in response to the prompt).

For example, as described above, FIGS. 6A and 6B detail receipt of an incoming call at a first device and receipt of at least one functional capability of the second device by the first device. However, instead of automatically causing transfer of operation 260 as shown in FIG. 6C, in some embodiments, with reference to FIG. 6D, the first device 200 may transmit instructions (e.g., signal 263) for the second device 220 to prompt the user to determine whether to transfer the operation to the second device 220 (e.g., prompt 266). As such, a prompt 266 of "RECEIVE CALL HERE" with a selection capability of "Yes" (e.g., virtual button 267) or "No" (e.g., virtual button 268) could be displayed on the display 223 of the second device 220. Additionally or alternatively, the first device 200 may cause display of a prompt on the display 203 of the first device 200.

In response to the prompt 266 shown in FIG. 6D, the user may select to have the operation transferred. In such a circumstance, with reference to FIG. 6E, the second device 220 may transmit a signal 269 to the first device 200 indicating that the user desires the operation to be transferred. In response, the first device 200 may transmit a signal 264' that indicates that the second device 220 should perform the operation (e.g., send the incoming call to the second device 220). In response the second device 220 may perform the operation 270 and enable the user to determine whether to answer the incoming call (e.g., "CONNECT" 272) or ignore the incoming call (e.g., "IGNORE" 274).

However, with reference to FIG. 6F, if the user selects not to have the operation transferred, then the second device 220 may transmit a signal 269' indicating that the user desires the operation not to be transferred. In such a circumstance, the first device 200 may perform the operation 270.

In some embodiments, the prompt 266 may have a time limit that automatically determines that the user does not wish the operation to be transferred. For example, if the user has not selected "Yes" or "No" after a pre-determined amount of time (e.g., 5 seconds, 10 seconds, etc.), the second device 220 may transmit a signal to the first device 200 indicating that the operation should not be transferred.

In some embodiments, the apparatus 102 may be configured to cause transfer of the operation in an instance in which a user defined setting indicates that transfer of the operation is enabled. As such, in some embodiments, the apparatus 102 may be configured to enable a user to pre-set a user defined setting. In some embodiments, such a user defined setting may indicate a user's desire to always enable operation transfer (e.g., enabled) or never allow operation transfer (e.g., disabled). Additionally or alternatively, the user may define specific circumstances in which operation transfer should be enabled and/or disabled. For example, a user may define certain operations where operation transfer should be enabled/disabled. Similarly, the user may define certain devices that operation transfer should be enabled/disabled with. In some embodiments, a user may define certain operations with certain devices in which operation transfer should be enabled/disabled.

In some embodiments, the determination when to cause transfer of an operation may be based on a defined relationship between respective functional capabilities of the first device and second device. For example, the apparatus 102 may be configured to determine and compare capability values for each device in order to determine which device is better suited for performance of the operation.

In some embodiments, the apparatus 102 may be configured to determine a first capability value of the first device based on at least one functional capability of the first device and based on the operation. The capability value may be any value (e.g., numeric, relative, etc.) that quantifies the device's ability to perform the operation, including the effectiveness of the performance. For example, with reference to FIG. 5B, the first device 200 is causing a video to be played on the display 203 (e.g., performing operation 250). The first device 200 may be configured to determine a first capability value for the first device 200. The first capability value may be based on, inter alia, the size of the display 203 and the operation 250 to be performed (e.g., playing a video). As an example, in a circumstance in which numerical values range from 0 to 10 for quantification of the capability values, the first device 200 may have a first capability value of 5 out of 10.

In some embodiments, the apparatus 102 may be configured to determine a second capability value of the second device based on at least one functional capability of the second device and based on the operation. Like the first capability value, the second capability value may be any value (e.g., numeric, relative, etc.) that quantifies the device's ability to perform the operation, including the effectiveness of the performance. For example, with reference to FIG. 5B, the first device 200 may be configured to determine a second capability value for the second device 220. The second capability value may be based on, inter alia, the size of the display 223 and the operation 250 to be performed (e.g., playing a video). As an example, in a circumstance in which numerical values range from 0 to 10 for quantification of the capability values, the second device 220 may have a second capability value of 6 out of 10. In such an example, the second capability value of 6 for the second device 220, as opposed to 5 for the first device 200, may be due to the larger size of the display 223 of the second device 220.

In some embodiments, the apparatus 102 may be configured to compare the first capability value and the second capability value. Then, based on a pre-defined relationship between the respective capability values, the apparatus 102 may be configured to cause transfer of the operation from the first device to the second device. For example, in some embodiments, the apparatus 102 may be configured to cause transfer of the operation from the first device to the second device in an instance in which the second capability value (e.g., of the second device) exceeds the first capability value (e.g., of the first device). For example, with reference to FIGS. 5B and 5C, the first device 200 may compare the first capability value of 5 to the second capability value of 6 and determine that the second capability value exceeds the first capability value and, thus, cause transfer of the operation 250 from the first device 200 to the second device 220. In such a manner, some embodiments of the present invention enable transfer of a specific operation to a proximate device that is better suited to perform that operation.

Though the above example describes numeric values from 0 to 10 for the respective capability values, embodiments of the present invention envision other value quantifiers for capability values (e.g., high/low, above/below average, fractions, etc.). Likewise, though a specific example of the second capability value exceeding the first capability value is used, other pre-defined relationships may be used to determine whether an operation should be transferred between proximate devices (e.g., less than, equal to, two times greater, etc.).

In some embodiments, other criteria may be used to determine the capability values for respective devices. For example, in some embodiments, the apparatus 102 may be configured to determine a capability value of a device based in part on user defined preferences. For example, a user may set a user defined preference for a preferable device for a certain operation (e.g., always receive calls on my cellular device). Another example user defined preference may be the assigning of a weighted preference for a certain component of a device (e.g., the user may prefer to use dedicated keyboards to type texts or emails). In such an example, a device may receive a bonus to its capability value for having a dedicated keyboard. Other example user defined preferences may include, but are not limited to, distance to proximate device, percentage of battery life of each device, among others. In such a regard, some embodiments of the present invention provide for user configurable transfer of operations between proximate devices.

Though example embodiments described herein are described with respect to two devices (e.g., a first device and a second device), embodiments of the present invention contemplate operational transferring between multiple devices. As such, the apparatus 102 may account for more than one "second" device when determining whether to (and where to) transfer an operation.

In some embodiments, the apparatus 102 may be configured to change and/or adapt an operation to be performed based on the functional capabilities of the proximate devices. For example, the apparatus 102 may take into account a pre-defined operation hierarchy for performance of operations. In particular, if any, or all, of the devices are unable to perform the operation, such as through their respective functional capabilities, the apparatus 102 may be configured to change the operation to one that can be performed by at least one of the devices. Then, the apparatus 102 may be configured to cause transfer of the newly changed operation to the device that can now perform the operation.

For example, a Skype call may be sent to a first device. However, the first device may determine that it does not have the functional capability to execute a Skype call. Additionally, the first device may determine that a second proximate device also does not have the functional capability to execute a Skype call. The first device may determine that the second proximate device can support a cellular call and, in response, the first device may change the Skype call to become a cellular communication and then transfer the cellular communication to the second device. Along these same lines, a voice call or Skype call may be changed to a text message based on available functional capabilities of proximate devices. Such an embodiment provides for an adaptable system that can be tailored to the specific functional capabilities of the devices available.

Embodiments of the present invention provide methods, apparatus and computer program products for operational routing between proximate devices. Various examples of the operations performed in accordance with embodiments of the present invention will now be provided with reference to FIGS. 7-8.

FIG. 7 illustrates a flowchart according to an example method for operational routing between proximate devices according to an example embodiment 300. The operations illustrated in and described with respect to FIG. 7 may, for example, be performed by, with the assistance of, and/or under the control of one or more of the processor 110, memory 112, communication interface 114, user interface 116, sensor 118, or UI control circuitry 122. Operation 302 may comprise receiving an indication that a second device is proximate a first device. The processor 110, communication interface 114, user interface 116, sensor 118, and/or UI control circuitry 122 may, for example, provide means for performing operation 302. Operation 304 may comprise receiving an indication of at least one functional capability of the second device. The processor 110, communication interface 114, user interface 116, sensor 118, and/or UI control circuitry 122 may, for example, provide means for performing operation 304. Operation 306 may comprise causing transfer of an operation from the first device to the second device based on at least one functional capability of the first device and the at least one functional capability of the second device and further based on the operation. The processor 110 and/or communication interface 114 may, for example, provide means for performing operation 306.

FIG. 8 illustrates a flowchart according to another example method for operational routing between proximate devices according to an example embodiment 400. The operations illustrated in and described with respect to FIG. 8 may, for example, be performed by, with the assistance of, and/or under the control of one or more of the processor 110, memory 112, communication interface 114, user interface 116, sensor 118, or UI control circuitry 122. Operation 402 may comprise receiving an indication that a second device is proximate a first device. The processor 110, communication interface 114, user interface 116, sensor 118, and/or UI control circuitry 122 may, for example, provide means for performing operation 402. Operation 404 may comprise receiving an indication of at least one functional capability of the second device. The processor 110, communication interface 114, user interface 116, sensor 118, and/or UI control circuitry 122 may, for example, provide means for performing operation 404.

Operation 406 may comprise determining a first capability value of the first device based at least in part on at least one functional capability of the first device and an operation. The processor 110 may, for example, provide means for performing operation 406. Operation 408 may comprise determining a second capability value of the second device based at least in part on at least one functional capability of the second device and an operation. The processor 110 may, for example, provide means for performing operation 408.

Operation 410 may comprise causing transfer of an operation from the first device to the second device in an instance in which the second capability value exceeds the first capability value. The processor 110 and/or communication interface 114 may, for example, provide means for performing operation 410.

FIGS. 7-8 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   initiating performance of an operation on a first device, wherein the first device is capable of executing and completing performance of the operation;
   receiving an indication, at the first device, that a second device is proximate the first device;
   receiving an indication, at the first device, of at least one user interface capability numerical value of the second device that defines, at least in part, a quantifiable ability of the second device to perform the operation instead of the first device;
   determining at least one user interface capability numerical value of the first device that defines a quantifiable ability of the first device to perform the operation;
   comparing the at least one user interface capability numerical value, defining at least in part the quantifiable ability of the first device to perform the operation, with the at least one user interface capability numerical value defining at least in part the quantifiable ability of the second device to perform the operation instead of the first device;
   determining that the second device has an associated user interface capability numerical value that satisfies a pre-defined relationship in comparison to the user interface capability numerical value of the first device; and
   in response to determining that the second device has an associated user interface capability numerical value that satisfies the pre-defined relationship in comparison to the user interface capability numerical value of the first device, determining that performance of the operation being performed on the first device should be transferred from the first device to the second device and enabling transfer of the operation from the first device to the second device, wherein in response to transferring performance of the operation from the first device to the second device, the operation is no longer performed on the first device after the transfer.

2. The method according to claim 1, wherein method further comprises: causing a user to be prompted as to whether the operation should be transferred from the first device to the second device, prior to any transfer of performance of the operation from the first device to the second device.

3. The method according to claim 1, wherein the operation comprises providing content via a user interface.

4. Computer program product comprising a non-transitory computer readable medium having program code portions stored thereon, the program code portions being configured, when the program product is run on a computer or network device, to cause the method of claim 1 to be performed.

5. The method according to claim 1, further comprising modifying the operation to enable performance on the second device based on the at least one user interface capability numerical value of the second device prior to causing transfer of the operation to the second device.

6. The method according to claim 1, further comprising: deciding to enable transfer of performance of the operation from the first device to the second device based on the comparison; and causing transfer of the operation from the first device to the second device in order to complete the operation on the second device.

7. The method according to claim 1, further comprising: causing transfer of the operation from the first device to the second device, after deciding that the second device has an associated user interface capability numerical value that satisfies the pre-defined relationship in comparison to the user interface capability numerical value of the first device, in order to complete the operation on the second device.

8. The method according to claim 1, wherein performance of the operation is initiated prior to receiving an indication that the second device is proximate the first device.

9. The method according to claim 1, wherein comparing the at least one user interface capability numerical value of the first device with the at least one user interface capability numerical value of the second device comprises determining whether a first capability numerical value, defining at least in part the ability of the first device to perform the operation, exceeds a second capability numerical value defining at least in part the quantifiable ability of the second device to perform the operation instead of the first device.

10. The apparatus according to claim 1, wherein the computer program code is configured to, with the at least one processor, cause the apparatus to: decide not to enable transfer of performance of the operation from the first device to the second device based on the comparison; refrain from causing transfer of the operation from the first device to the second device; and enable the operation to be completed on the first device.

11. An apparatus comprising at least one processor and memory including computer program code, the memory and the computer program code configured to, with the at least one processor, cause the apparatus to:
    initiate performance of an operation on a first device, wherein the first device is capable of executing and completing performance of the operation;
    enable the first device to receive an indication that the second device is proximate the first device;
    enable the first device to receive an indication of at least one user interface capability numerical value of the second device that defines, at least in part, a quantifiable ability of the second device to perform the operation instead of the first device;
    determine at least one user interface capability numerical value of the first device that defines a quantifiable ability of the first device to perform the operation;
    compare the at least one user interface capability, defining at least in part the quantifiable ability of the first device to perform the operation with the at least one user interface capability numerical value defining at least in part the quantifiable ability of the second device to perform the operation instead of the first device;
    determine that the second device has an associated user interface capability numerical value that satisfies a pre-defined relationship in comparison to the user interface capability numerical value of the first device; and
    in response to determining that the second device has an associated user interface capability numerical value that satisfies the pre-defined relationship in comparison to the user interface capability numerical value of the first device, determining that performance of the operation being performed on the first device should be transferred from the first device to the second device and enable transfer of the operation from the first device to the second device, wherein in response to transferring performance of the operation from the first device to the second device, the operation is no longer performed on the first device after the transfer.

12. The apparatus according to claim 11, wherein the memory and the computer program code are further configured to, with the processor, cause the apparatus to cause a user to be prompted as to whether the operation should be transferred from the first device to the second device, prior to any transfer of performance of the operation from the first device to the second device.

13. The apparatus according to claim 11, wherein the operation comprises providing content via a user interface.

14. The apparatus according to claim 11, wherein the memory and the computer program code are further configured to, with the processor, cause the apparatus to modify the operation to enable performance on the second device based on the at least one user interface capability numerical value of the second device prior to causing transfer of the operation to the second device.

15. The apparatus according to claim 11, wherein the computer program code is configured to, with the at least one processor, cause the apparatus to: cause transfer of the operation from the first device to the second device, after deciding that the second device has an associated user interface capability numerical value that satisfies a pre-defined relationship in comparison to the user interface capability numerical value of the first device, in order to complete the operation on the second device.

16. The apparatus according to claim 11, wherein the apparatus is the first device.

17. The apparatus of claim 11, wherein deciding whether or not to enable transfer of performance of the operation from the first device to the second device comprises deciding to transfer performance of the operation based on a determination, from at least one result of the comparison, that the second device is better suited to performing the operation than the first device.

18. The apparatus of claim 17, wherein the first device is capable of completing the operation but the second device is better suited to completing the operation than the first device.

19. The apparatus of claim 11, wherein the at least one user interface capability numerical value, defining at least in part the ability of the first device to perform the operation, is compared with the at least one user interface capability numerical value, defining at least in part the ability of the second device to perform the operation instead of the first device, prior to deciding whether or not to enable transfer of performance of the operation from the first device to the second device.

20. An apparatus comprising at least one processor and memory including computer program code, the memory and the computer program code configured to, with the at least one processor, cause the apparatus to:
  enable the first device to receive an indication that a second device is proximate a first device;
  enable the first device to receive an indication of at least one user interface capability numerical value of the second device that defines, at least in part, a quantifiable ability of the second device to perform the operation instead of the first device;
  determine at least one user interface capability numerical value of the first device that defines a quantifiable ability of the first device to perform the operation;
  compare the at least one user interface capability numerical value of the first device, defining at least in part the quantifiable ability of the first device to perform the operation, with the at least one user interface capability numerical value defining at least in part the quantifiable ability of the second device to perform the operation instead of the first device;
  determine that the second device has an associated user interface capability numerical value that satisfies a pre-defined relationship in comparison to the user interface capability numerical value of the first device;
  in response to determining that the second device has an associated user interface capability numerical value that satisfies the pre-defined relationship in comparison to the user interface capability numerical value of the first device, enable an operation to be transferred from the first device to the second device;
  cause a prompt to be displayed, on at least one of the first device and the second device, asking whether to transfer the operation from the first device to the second device; and
  cause, in response to a selection by the user to have the operation transferred, transfer of the operation from the first device to the second device, wherein in response to transferring performance of the operation from the first device to the second device, the operation is no longer performed on the first device after the transfer.

21. The apparatus of claim 20, wherein the prompt is displayed on the first device.

22. The apparatus of claim 20, wherein the computer program code is configured to cause the apparatus to: cause instructions for the second device to display the prompt to be transmitted from the first device to the second device, wherein the operation is transferred from the first device to the second device in response to reception of a signal, at the first device, from the second device indicating that the user selected to have the operation transferred.

23. The apparatus of claim 20, wherein the apparatus is the first device.

* * * * *

UNITED STATES PATENT AND TRADEMARK OFFICE
CERTIFICATE OF CORRECTION

PATENT NO. : 9,936,329 B2
APPLICATION NO. : 13/416727
DATED : April 3, 2018
INVENTOR(S) : Dearman Page 1 of 1

It is certified that error appears in the above-identified patent and that said Letters Patent is hereby corrected as shown below:

In the Claims

Claim 2, Column 21, Line 52 delete "wherein" and insert --wherein the--

Signed and Sealed this
Twenty-seventh Day of August, 2019

Andrei Iancu
*Director of the United States Patent and Trademark Office*